B. F. WEBER & F. E. WOODFORD.
TELPHER.
APPLICATION FILED FEB. 24, 1910.
1,257,560.
Patented Feb. 26, 1918.
8 SHEETS—SHEET 8.
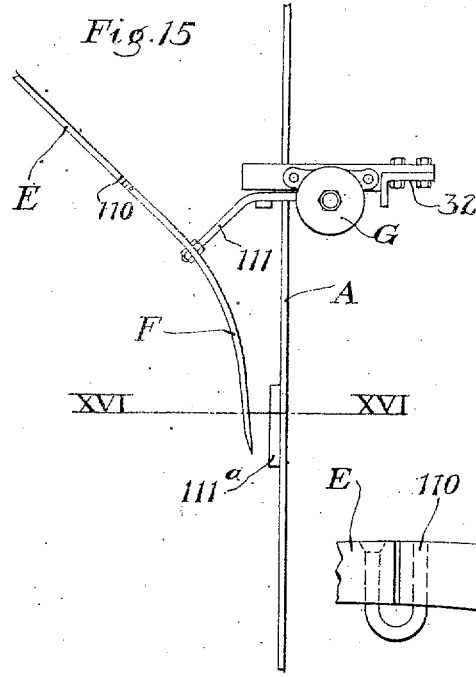
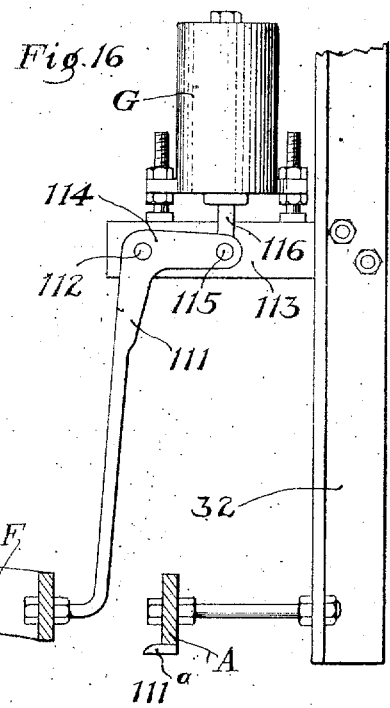
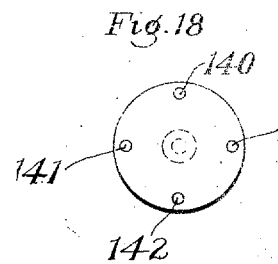
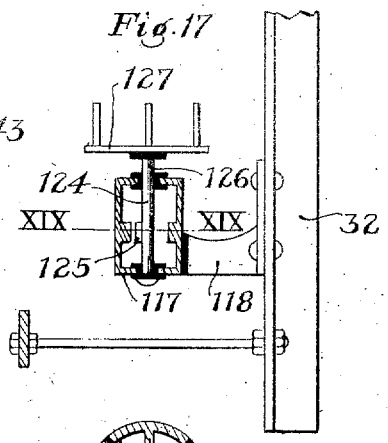

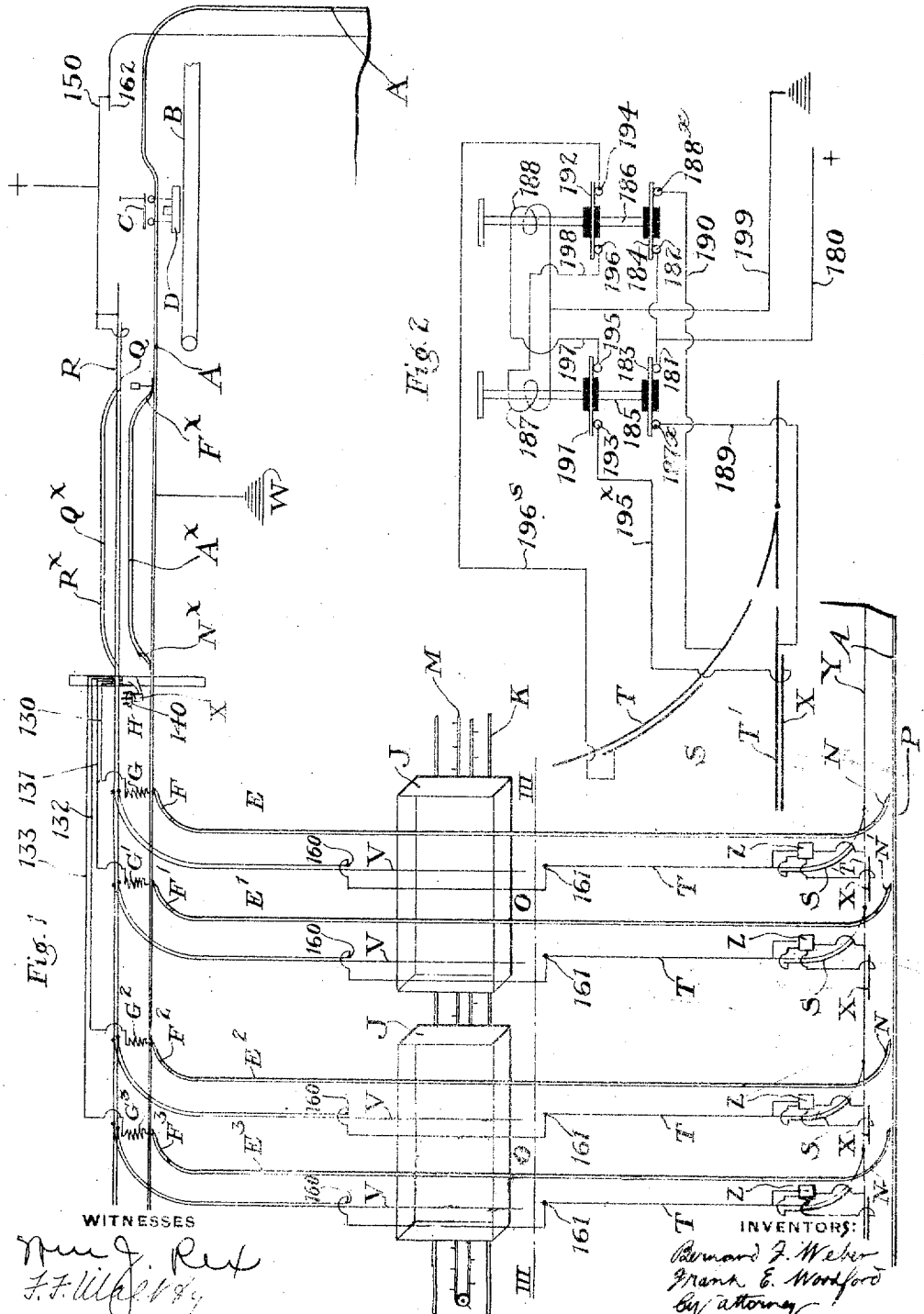

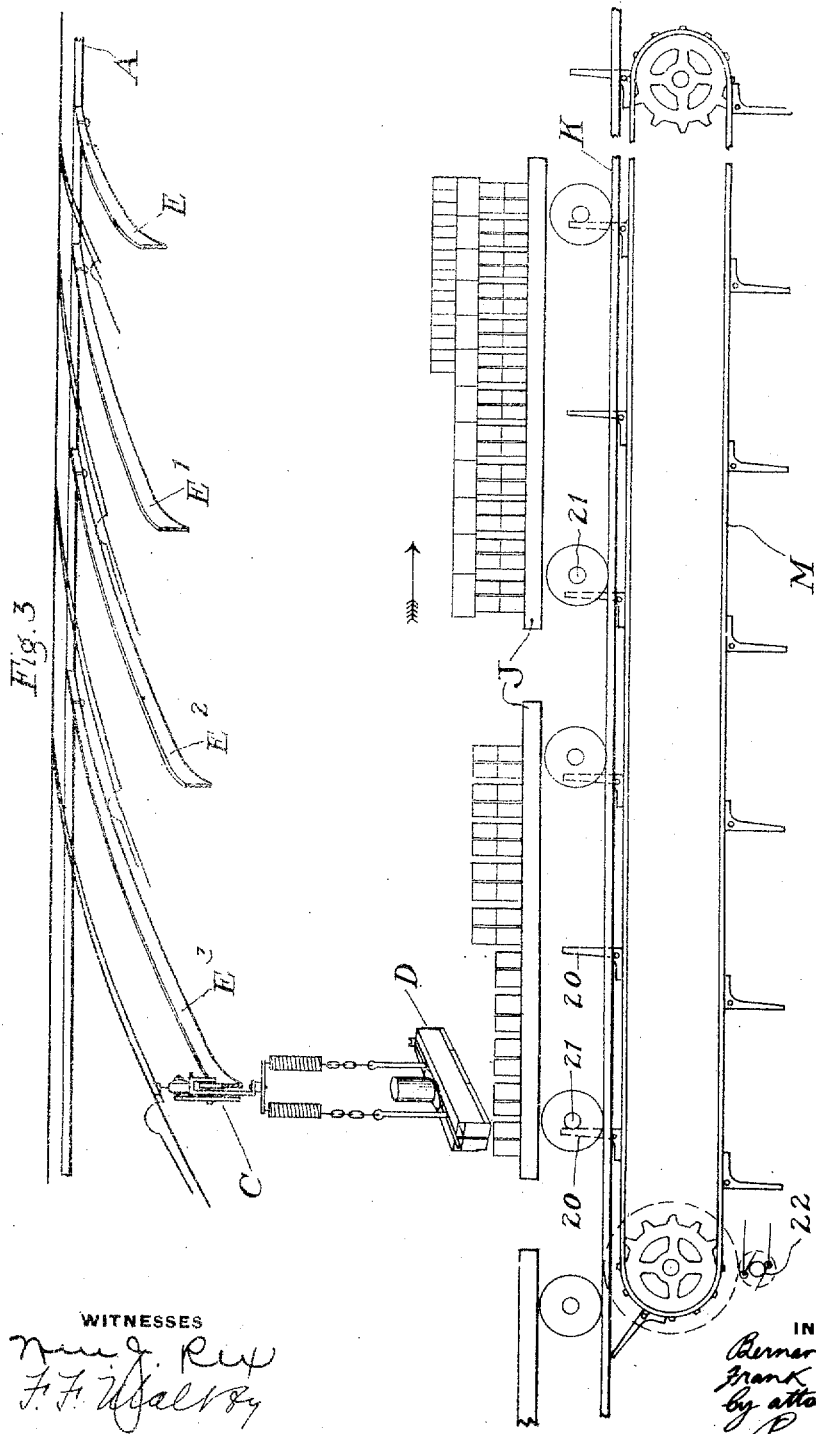

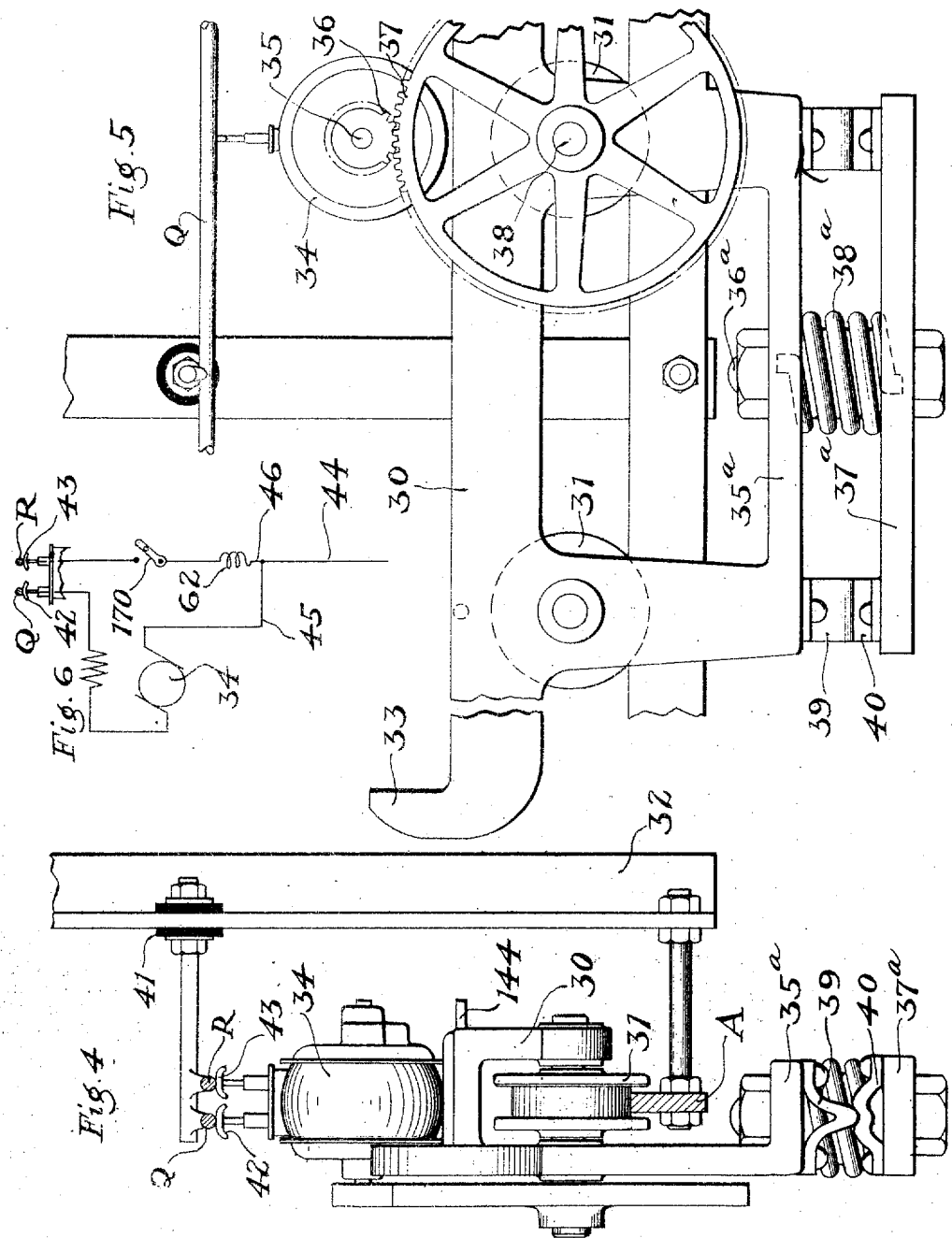

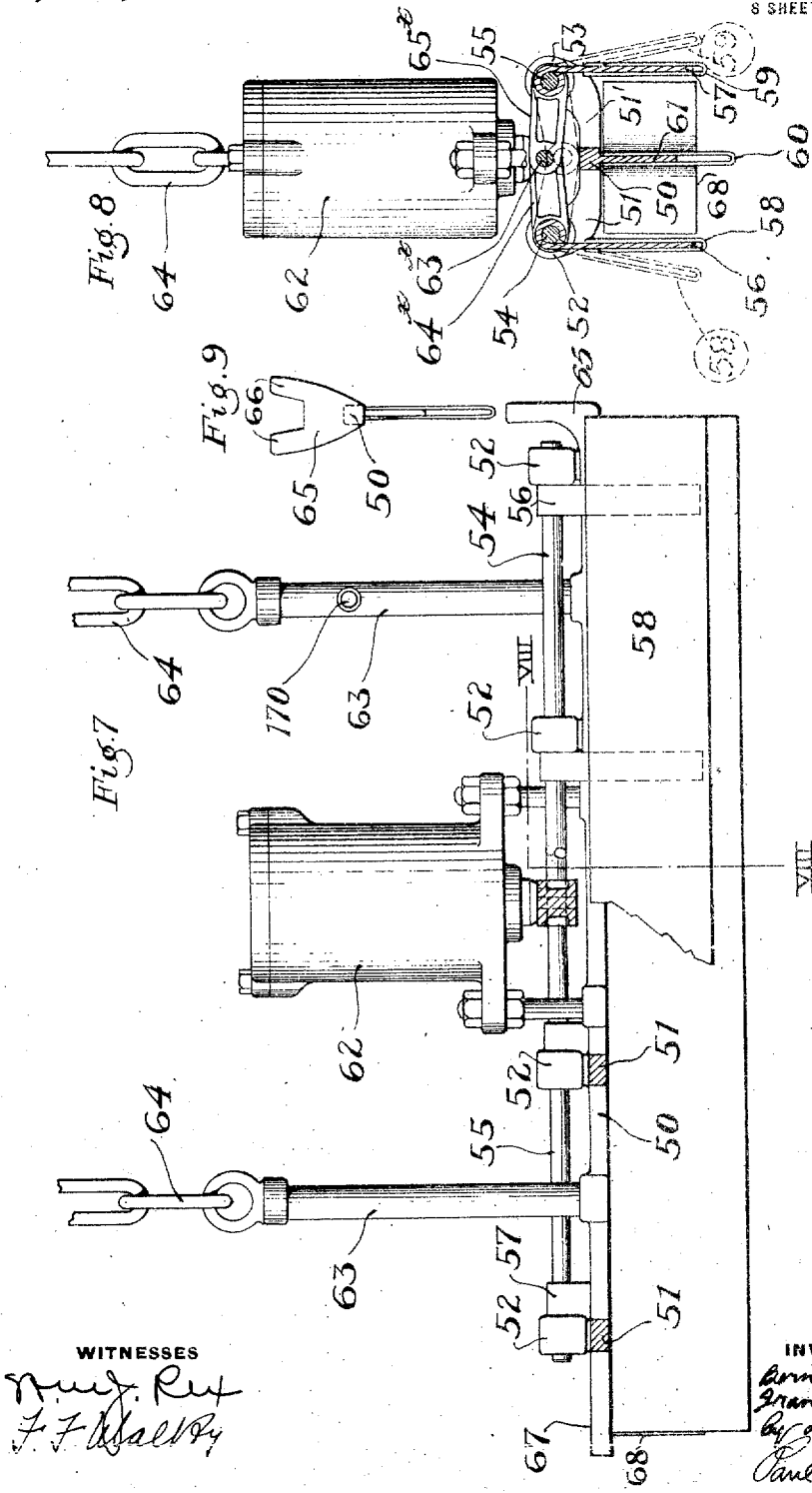

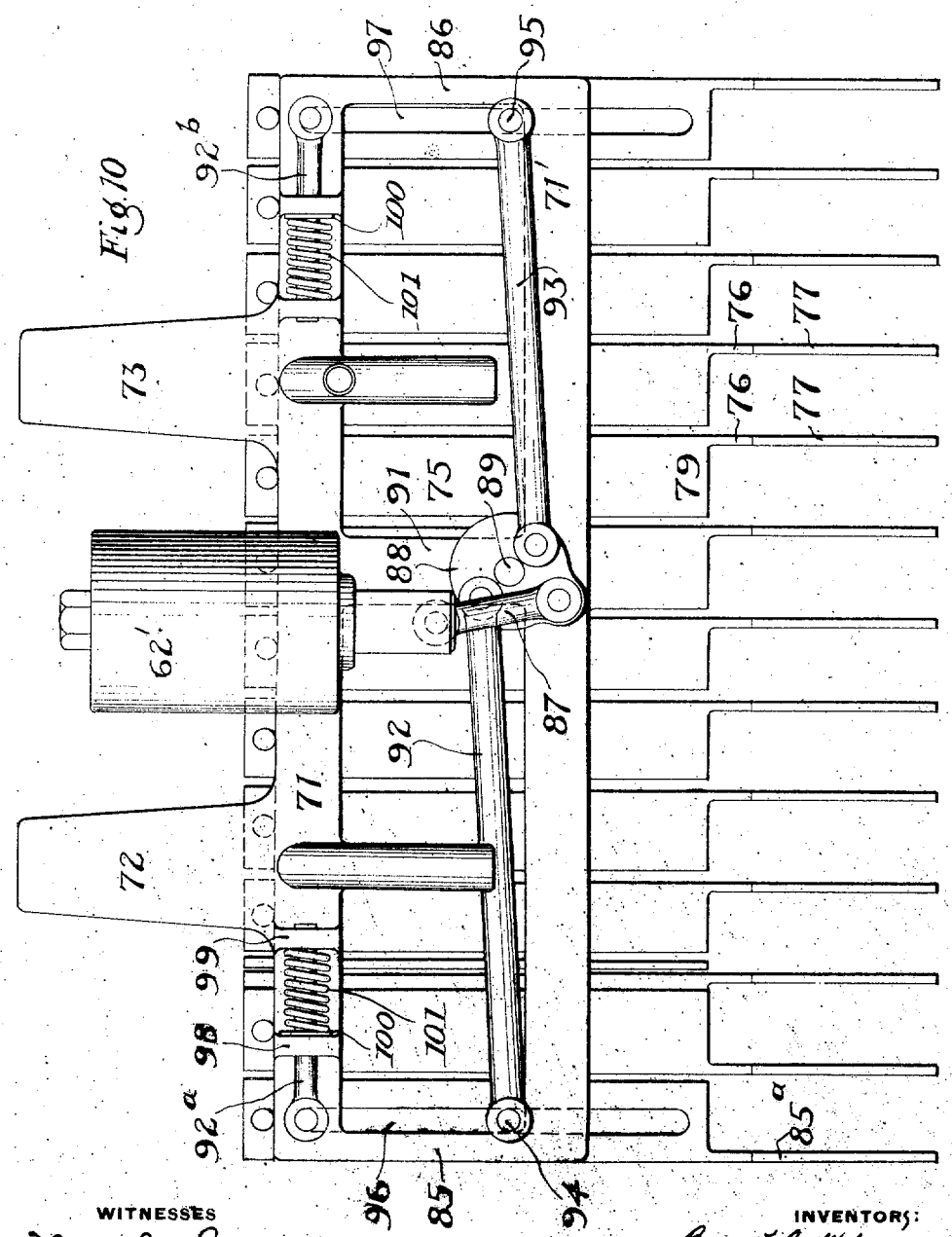

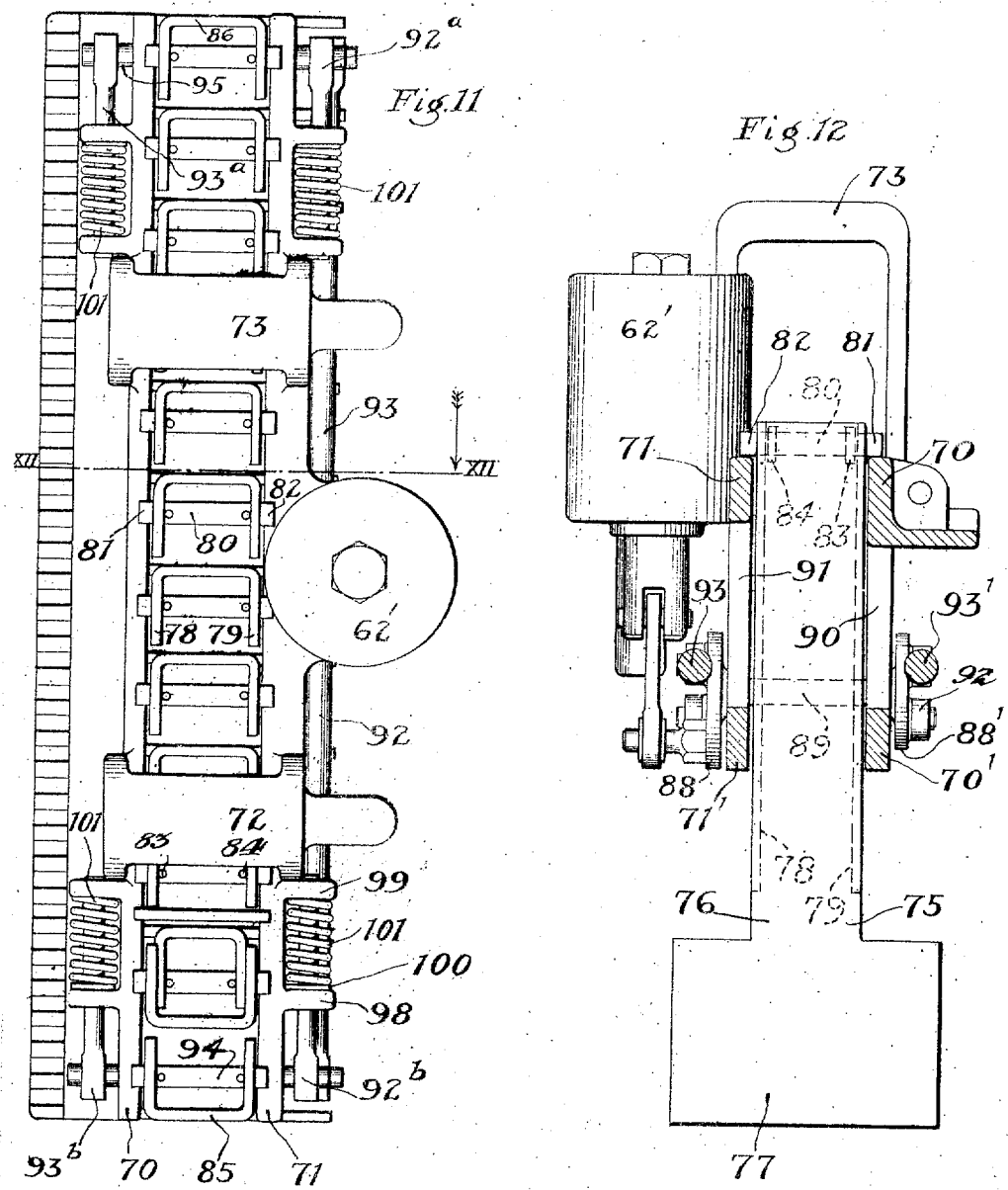

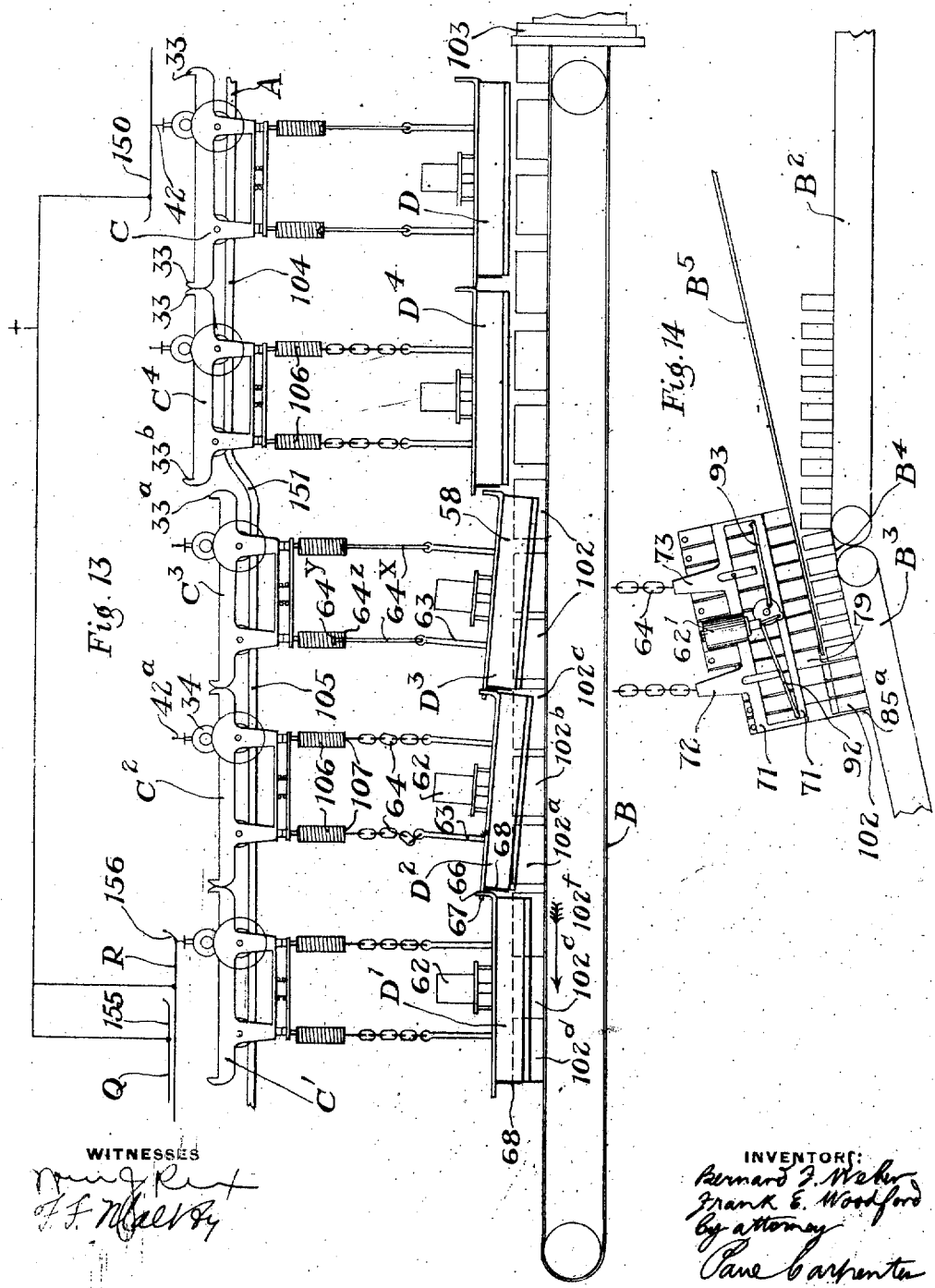

UNITED STATES PATENT OFFICE.

BERNARD F. WEBER AND FRANK E. WOODFORD, OF CHICAGO, ILLINOIS.

TELPHER.

1,257,560.     Specification of Letters Patent.     Patented Feb. 26, 1918.

Application filed February 24, 1910. Serial No. 545,616.

*To all whom it may concern:*

Be it known that we, BERNARD F. WEBER and FRANK E. WOODFORD, citizens of the United States, and residents of Chicago, in the State of Illinois, have invented certain new and useful improvements in Telphers, of which the following is a specification.

Our present invention relates to conveyers in general and more particularly aerial tramways, and has special reference to the intramural transportation of articles in process of manufacture from one part of the manufacturing establishment to another part thereof. In the present instance, we have shown an embodiment of our invention especially adapted for use in a brick yard.

The principal objects of our present invention are: the provision of automatically operated carrier apparatus for transferring brick, as they issue from the brick making machine, to the cars upon which they are "hacked" preparatory to storing, drying or burning, with the intervention of a minimum amount of manual labor; the provision of an improved system of mono-rail tracks for supporting the conveyer units and elevating or lowering them to any desired level for convenience in depositing the load; the provision of an improved design of motor driven trolley for operating the individual carriers; the provision of an improved form of individual carriers for supporting the goods to be transported; the provision of co-operating means whereby the operation of the carrier units, and of the engaging means carried thereby, may be varied when desired and thereafter automatically restored; the provision of improved means for intermittently driving the individual conveyer units; the provision of improved means for intermittently exciting the engaging mechanism and causing them to engage the articles to be transported; the provision of elastic means whereby the carriers may be conveniently lowered or turned, or both, as may be desired, in order that the load may be deposited without injury thereto and in any desired position; the provision of improved means for disengaging the individual carriers from the load and automatically returning the carriers to former operative position; the provision of automatically operated electrical means for controlling the movements of each of the individual trolleys and of the engaging means carried thereby; the provision of means whereby the several members of a series of carriers may be diverted in rotation to several corresponding members of a series of switch tracks; the provision of means for restraining the simultaneous approach of a plurality of trolleys to the point of convergence of a switch track with the main line, and thereby preventing collision and possible derailment or damage to any one of the individual conveyer units; the provision of means for moving cars upon which the brick are "hacked", at a rate of speed proportional to the normal rate of delivery of brick thereto; the provision of means whereby any curvature or irregularity in the bricks as they issue from the brick forming mechanism may be removed, together with such other objects as may hereinafter appear.

In the manufacture of bricks as customarily carried on at this day, the bricks as they issue from the forming mechanism are deposited upon an endless belt conveyer running to a point adjacent to a series of cars, and as the bricks approach the cars they are manually lifted from the belt and placed in the desired position upon the cars. This system of operation is objectionable in the following respects:

Firstly—In order that it may be carried out at all, all of the operatives removing brick from the conveyer and the belt and hacking them on the cars, must move in unison to avoid interference, and the speed with which the transference of the brick may be accomplished is governed by that of the least efficient operator;

Secondly—Much time is lost and the capacity of the plant reduced in the event of the absence for any cause of one of the operatives; that is, any variation in the number of operatives, even for a short time, requires the proportionate variation in the speed of the conveyer belt;

Thirdly—In the event that the operatives become incoördinated even momentarily, some of the brick must pass by and become lost;

Fourthly—For the efficient disposition of the brick issuing from but a single forming mechanism, the employment of a large number of operatives is required.

In attaining the objects above mentioned and gaining certain further benefits and advantages below to be disclosed, as well as in overcoming the objections hereinbefore referred to, we have provided a construction one embodiment of which is illustrated in the accompanying drawings wherein—

Figure 1 is a general diagrammatic plan view of a conveyer system embodying our improvements as useful in a brick making establishment;

Fig. 2 is a diagrammatic representation of a portion of the electrical equipment and controlling means therefor preferably used by us in connection with the apparatus of Fig. 1;

Fig. 3 is an enlarged transverse elevational view, partially in section, taken on the line III—III of Fig. 1;

Figs. 4 and 5 are respectively end and side elevational views of one of the individual trolleys used in connection with the apparatus of Fig. 1;

Fig. 6 is a wiring diagram of the electrical connections utilized in connection with the driving motor of Figs. 4 and 5 and engaging means of Figs. 7-12;

Figs. 7 and 8 are respectively partially broken away side and partially sectioned elevations of a form of carrier mechanism used for engaging one type of brick, Fig. 8 being taken on the line VIII—VIII of Fig. 7;

Fig. 9 is an elevational view of a detail of the end of Fig. 7;

Figs. 10, 11, and 12 are respectively a side elevational view, a plan view, and a transverse elevational view partially in section, of a form of engaging mechanism used in connection with another type of brick, the view of Fig. 12 being taken on the line XII—XII of Fig. 11;

Fig. 13 is a diagrammatic view illustrative of the relative positions assumed by the several members of a series of trolley units and carrier units as they respectively come into position to engage, and complete the operation of engagement of, the several members of a row of brick, the conveyer units being of the type illustrated in Figs. 7 and 8;

Fig. 14 is a fragmentary view of the detail of construction showing the means whereby the conveyer units of Figs. 10 to 12 are caused to engage brick of another type than those indicated in Fig. 13;

Figs. 15 and 16 are respectively plan and enlarged elevational views of the switch operating mechanism preferably employed by us in connection with the construction of Fig. 1, Fig. 16 being taken on the line XVI—XVI of Fig. 15;

Fig. 17 is an elevation, partly in section, of the circuit changing mechanism preferably used by us for actuating the switch operating mechanism of Figs. 15 and 16; and—

Figs. 18 and 19 are respectively a plan view and a sectional view of certain details of the construction of Fig. 17, Fig. 19 being taken on the line XIX—XIX of Fig. 17.

In carrying out our invention in preferred form we make use of the following principal elements, in connection with a brick making machine, viz: a trolley track A, A, A, located immediately above a conveyer belt B adapted to receive brick as they come from the forming machine; a plurality of motor trolleys C running on the track A; carrier devices D respectively supported by the trolleys C; a plurality of branch tracks E diverging from the main track A and afterward converging therewith, each of said tracks E being provided with a switch F, and switch operating means G; a single circuit changer H for completing in rotation the circuits through the several actuating means G; a plurality of cars J on tracks K, upon which cars the bricks may be hacked preparatory to storing, drying or burning, the tracks being disposed transversely to the trolley tracks E; driving mechanism M for imparting a continuous motion to the cars J as they traverse the planes of the tracks E; self-closing switches N arranged to normally connect the branch tracks E with that part of the main track A indicated at P; a suitable electrical conductor Q for feeding the trolley motors, and a suitable conductor R for exciting the operating means actuating the engaging devices of the carriers D; secondary conductors S located adjacent the branches T of the conductor Q; short branches V of the conductor R; secondary conductors X located adjacent that part of the conductor Q indicated at Y, and circuit changers Z for controlling the feed to the conductors S and X, it being understood that a common return for all electrical equipment is had through the rail A to the ground W.

Referring now more particularly to Figs. 1 and 3, it will be observed that the center branches E, E', E² and E³ of the main trolley track A are located at different heights above the rails K upon which the cars J move, to the end that the carriers D will at all times be conveniently close to the surface of the cars J or to the bricks piled thereupon, thereby avoiding not only unnecessary expenditure of effort by the operatives in discharging the bricks upon the car, but also danger of breakage of such bricks by dropping them. In order that each of the cars J may be moved from a convenient position below the track E³ to the tracks E², E' and E, in succession, at a rate of speed which will approximate the rate of delivery of brick by the carriers D, we preferably utilize the driving mechanism indicated at M in Fig. 1, wherein as will be seen upon reference to Fig. 3 the conveyer M (driven by a motor 22) is of a chain construction and provided with arms 20 normally disposed at right angles to the conveyer, but movable relatively thereto in one direction only, to wit—the direction of normal travel of the conveyer, such arms 20 being adapted to engage the axles 21 of the cars J and drive such cars forward in the direction indicated by the arrow.

Referring now more particularly to Figs. 4, 5, and 6 which illustrate more fully the construction of the trolley indicated at C in Fig. 1, it will be observed that the present form of trolley comprises a frame 30 having a pair of supporting wheels 31—31, riding upon the track A which is supported from the bracket 32. The frame 30 is provided at each end with upturned bumpers 33 rounded for a purpose to be below described in connection with Fig. 13, and upon one end of the frame is mounted a motor 34 whose shaft 35 carries a pinion 36 driving a gear 37, in turn mounted upon the axle 38 of one of the trolley wheels 31. For the purpose of affording a pivotal support for the carriers D of Fig. 1, we mount centrally in the lower part 35ª of the frame 30, pivotally by bolt 36ª loosely fixed therein, a hanging bar 37ª for the supporting elements below to be described in connection with Figs. 7 to 12, a spring 38ª riveted to the members 35ª and 37ª and encircling the bolt 36ª being provided to restore them to parallelism should they be moved therefrom in the operation of the device. As an auxiliary means for holding the members 35ª and 37ª in such parallelism, we provide coöperating spring catch elements 39 and 40, the member 39 having an extension adapted to fit in a socket formed in member 40 and prevent relative movement of the members 35ª and 37ª save under conditions of stress greater than that resisted by the spring 38ª.

For energizing the motor 34, and exciting the actuating means for the engaging mechanisms of Figs. 5 to 12, hereinafter described, we make use of two conductors, Q and R respectively, having a common feed of the same polarity, such conductors being supported from the above mentioned bracket 32 but insulated therefrom as indicated at 41, and spaced somewhat apart, contact being made with the conductors Q and R respectively by the collector shoes 42 and 43, the motor 34 and the actuating device 62 having a common return 44 by means of the wiring 45 and 46 (Fig. 6).

In that embodiment of our invention which is specially available for use in connection with an "end cut" brick machine (that is one which forms the brick from a bar of the two least dimensions of a completed brick) we make use of a construction of carrier and engaging mechanism illustrated in preferred form in Figs. 7, 8 and 9, wherein we utilize a skeleton framing comprising a longitudinal bar 50 having outstanding wings 51, 51' terminating in sockets 52, 53 wherein are mounted the rods 54, 55 carrying fixedly thereupon, the supporting arms 56, 57 respectively which are embraced by the plates 58, 59 respectively. Each of said plates comprises a strip of spring brass bent upon itself, and a similar spring plate 60 is adapted to embrace an outstanding flange 61 formed upon the longitudinal skeleton member 50. In order to actuate the outer spring members 58 and 59 and move them inwardly toward the central member 60, thus engaging the brick, we make use of a solenoid 62 whose core is connected to the rod 63ˣ upon which are revolubly mounted the links 64ˣ and 65ˣ whose other ends are fixed against rotation upon the rods 54 and 55. The central longitudinal member 50 is provided with suitable attaching posts 63 by means of which it may be suspended by flexible means (here indicated as a pair of chains 64) from the trolley C above described in connection with Figs. 4 to 6. The rear end of the longitudinal skeleton member 50 is provided with an upstanding stop 65 bifurcated as indicated at 66 in order to provide a socket for the projecting end 67 of the following carrier, and the forward end with a downwardly extending stop plate 68, both as is useful for purposes to be below described, in connection with Fig. 13.

Referring now more particularly to Figs. 10, 11, 12 wherein we have illustrated a preferred embodiment of that form of carrier and engaging mechanism which we find especially useful in connection with the transportation of bricks formed by a "side cut" brick machine, (that is one wherein the bar of clay as it issues from the machine presents the two greatest dimensions of a completed brick), it will be observed that we make use of parallel skeleton frame members 70 and 71 supported by the yokes 72 and 73 which in turn serve as attaching means for the suspension devices 64 of the trolley. Between the frame members 70 and 71 we mount a plurality of engaging members 75 preferably formed of spring brass, each of the members 75 comprises a shank portion 76 and an enlarged contact portion 77, the sides of the shank portions being turned at substantially right angles as indicated at 78, 79 for a two-fold purpose, viz: to provide a bearing for the supporting trunnions 80 whose outer ends 81 and 82 rest respectively upon the members 70 and 71 and are restrained from lateral displacement by the pins 83 and 84, and to restrain the longitudinal movement of the members 75 relatively to each other, it being observable from inspection of Figs. 10 and 12 that the vertical movement of such members above the frame element 70 and 71 is restrained only by contact of the enlarged portions 77 with the lower faces 70'—71'.

As is clearly to be seen in Figs. 10 and 11, the outermost of the members 75, that is, those indicated at 85 and 86, are so mounted as to be drawn inwardly toward each other, when the core of the solenoid 62' rises and lifts the link 87, turning the hub 88 carried by the shaft 89 which is supported in the vertical portions 90 disposed between the portions 70—70' and 71—71' of the skeleton frame elements, since upon the hub 88 we mount the connecting links 92 and 93 carrying at their outer ends rods 94 and 95 passing through slots 96 and 97 in the respective members 85 and 86, and respectively engaging corresponding rods 92' and 93' eccentrically mounted upon a hub 88' disposed on the shaft 89 opposite to the hub 88.

For the purpose of forcing the outermost elements 85 and 86 apart and outwardly, when the coil of the solenoid 62' is not excited, we mount the several connecting rods 92ª, 92ᵇ, 93ª, 93ᵇ in outstanding ears, such as shown at 98 and 99 with reference to the rod 92ª, fixing upon each thereof collars 100 and between each such collar and ear 99, a spring 101 in each case. This construction presents two advantages, first when the elements 85 and 86 are drawn toward each other the several springs 101 are compressed, tending to separate the members 85 and 86 immediately upon discontinuance of the excitation of the solenoid 62', and second the recoil of the spring is restrained by the contact of such collar 100 with the inner face of the ear 98.

Referring now more particularly to Fig. 13, it will be observed that we have here shown a plurality of the trolleys C and carriers D in the positions they assume relatively to each other and the brick 102 as such brick are discharged upon the belt B upon emergence from the brick forming device 103, at the time the conveyer units ride into position to engage such brick. From an examination of this figure it will be observed that a portion of the track A, nearest the point of emergence of the brick from the device 103 upon the belt 102, is elevated a distance equal substantially to the thickness of the brick, above that portion of the track indicated at 105 where the carriers D engage the brick, and that the rounded bumpers 33 are provided not only for the purpose of spacing the trolleys apart and preventing the swinging of the carriers D in alinement therewith, but also to insure that as each of the trolleys C approaches the one in front of it, they will not overlap when the respective ends come to the position indicated at 33ª and 33ᵇ but that the projecting portion 67 of the clamp will ride into the notched portions 66 of the forward clamp and prevent the rear clamp from any contact whatsoever with the brick engaged or about to become engaged with such forward carrier, as is very clearly to be seen on the comparison of the relative positions of the several carriers D', D² and D³. This construction also permits the use of the downwardly extending stop plate for retarding the brick as is desirable in the operation of our device below to be described.

As is likewise to be seen on an inspection of the present figure, in lieu of the flexible chains 64 and springs 106 for supporting the carriers D from the trolley C, we may use the rods 64ˣ headed at their upper ends as indicated at 64ʸ and adapted to reciprocate in the springs 106 interposed in alinement therewith as part of the flexible connections between the trolley C and carriers D, the springs in the case of the chains terminating in loops 107 and in case of the rods in apertured plates 64ᶻ to allow the reciprocation of the rods 64ˣ, and thereby attain flexibility.

Referring now more particularly to Fig. 14 wherein we have indicated the means for accomplishing the loading of the carriers, such as are shown in Figs. 10–12, it will be observed that the belt B² is here shown as carrying brick disposed transversely of the belt as from a side cut machine, instead of longitudinally of the belt as in Fig. 13, and it is to be noted that the apparatus here used is similar in all substantial respects to that of Fig. 13, save in this that the several additional elements here following are required, viz.: a belt B³ disposed at an angle to the belt B², a bridge plate B⁴ to allow the transfer of the brick from one belt to the other, and a guide plate B⁵ disposed above the belts B² and B³ but in the plane of the belt B³, to the end that as the first of the bricks 102 strike the outermost plate 85ª of the series of plates 75, held in their most elevated position by the plate B⁵, it will feed the device forward by the assistance of gravity and as each of the enlarged portions 77 become entirely disengaged from said plate B⁵, the following of such plates 75 descends in front of the next following brick. It is obvious from an inspection of Figs. 13 and 14 that to attain a most efficient operation of apparatus embodying our improvements, it is desirable that the brick be somewhat spaced apart prior to the instant of their final engagement with the carriers D.

Referring now more particularly to Figs. 15 and 16, it is to be noted that each of the switch members F is connected pivotally by means of the U shape device 110 fixedly mounted in the branch track member E, and that each is adapted to rest when closed against the rail A, upon a shelf 111ª projecting therefrom. The switch F is supported intermediate its ends by the operating lever 111 pivoted at 112 upon the arm 113 carried by the supporting bracket 32, the opposite end 114 of such lever having pivotal connection at 115 with the core 116 of the solenoid G. From inspection of Fig. 16, particularly, it will be observed that the weight of the solenoid core will hold the switch F out of engagement with the track A, save when it is excited in the manner to be below described.

Referring now more particularly to Figs. 17 to 19 wherein we have illustrated in some detail the circuit changing device indicated at H, Fig. 1, it will be seen that this comprises a suitable box or case 117 supported by a flanged web 118 from the supporting bracket 32, such casing being provided on its interior with contact members 120, 121, 122, and 123 leading respectively, by the wires 130, 131, 132, and 133 to the several solenoids G, G', G² and G³. Within the casing is mounted rotatably a contact carrier 124 provided with a brush 125 and adapted to complete the circuits through the wires 130, 131, 132, and 133 for energizing the solenoids G, G', G², G³. The outer end 126 of the shaft 124 is provided with a hub 127 having four upstanding fingers 140, 141, 142, and 143 corresponding respectively to the contacts 120, 121, 122, and 123 and solenoids G, G', G² and G³ for operating the switches F, F', F², and F³, respectively, the circuit changing device being operated by the arm 144 projecting from the trolley framing 30 striking one of the fingers 140, 141, 142 and 143.

The operation of a brick transporting apparatus embodying our present invention is as follows:

Assuming a plurality of carriers coming vertically over the belt B as is clearly to be understood from Figs. 1 and 13. Immediately the collector 42 passes out of contact with that part of the conductor Q indicated at 150, the trolley C descends the inclined portion 151 of the track A, allowing the elements 58, 59 and 60 to come into position to engage the brick 102 as may be seen at D', D² and D³. Conveyer B will move at greater speed than the carrier D' until the motor of the trolley C' is energized, and the carrier D' will thereby and by the impact of the carrier D² be moved to the position shown and its prior positions successively occupied by D² and D³. As soon as the collector 42 strikes the guideway indicated at 155, the trolley C' will be energized and the carrier D² will assume the relation parallel to the belt like that shown for the carrier D'. As the motion of the conveyer B in the direction indicated by the arrow is continuous, and the plate 68 of the carrier D² has dropped in front of the brick 102ª consequent upon the removal of the carrier D', the bricks 102ª, 102ᵇ, and 102ᶜ will close together similarly to those indicated at 102ᵈ, 102ᵉ, 102ᶠ. Immediately the collector shoe 43 strikes the guideway 156 of the conductor R the solenoid 62 will become excited, the pivoted sides 58 and 59 drawn inwardly toward the stationary center 60 and the bricks finally clamped in the carrier and any inequalities in their surfaces pressed out. The brick clamped in the carrier still contacting with the conveyer B, the carrier continues to progress in the direction indicated by the arrow until the contact 42 strikes that part of the conductor Q indicated at 155 when the motor is energized and begins its travel along the track A.

As the trolley C' approaches the circuit changer H and strikes the finger 140, (see Fig. 17) closing the circuit through the wire 130, the solenoid G (Fig. 16) is excited, the switch F (Fig. 15) is closed and the trolley C' is diverted down the track E. The approach of the following trolley C² will move the arm 141, open the circuit through the solenoid G and open the switch F, simultaneously closing the circuit through the wire 131, the solenoid G' and closing the switch F', like operations taking place with respect to the switches F² of the track E², and the switch F³ of the track E³, opening the switch previously closed and closing the next one in order, etc. When the contact 42 of the carrier C reaches the point on the conductor T indicated at 160, the energization of the motor is discontinued and the trolley comes to a stop, but the solenoid 62 continues to be excited. The operator standing at O then grasps the carrier C with his hand and brings it to its desired position above the car J, pulls down the carrier by extending the springs 106, and opens the clamp and discharges the brick by pressing upon the switch button 170, which opens the circuit through the coil of the solenoid 62, the weight of the core of such solenoid descending will move the clamp members 58 and 59 outwardly to their positions indicated in dotted lines in Fig. 8. The carrier C being relieved of the weight of the brick will immediately rise from the brick by means of the springs 106 previously held under tension, and the carrier may be then given a manual impulse along the track E, and as soon as the contact 42 strikes that part of the conductor T indicated at 161, the motor 34 will become energized and the carrier will proceed on its way along the track E and over the switch N and the track A until the trolley C again reaches the terminal 162 when the operation first described will be repeated.

It is to be observed that it will be impossible for a trolley coming from any one of the tracks E, E', E² or E³ to collide with a trolley coming from any other one of such tracks, by virtue of our use of the circuit interrupting mechanism illustrated in Fig. 2, which shows the details of the circuit changers Z energized through the conductors S and X. To illustrate the use of this mechanism we will assume a carrier on the track E approaching the switch N, and a carrier from the track E' (having passed the switch N') simultaneously approaching the switch N. In this case the conductors T and T' are both energized by means of the conductor 180 having contact members 181, 182 adapted to contact with the plates 183 and 184 carried on the cores 185 and 186 of the solenoids 187 and 188, respectively, the plate 183 being adapted to make contact with the contact member 187ˣ leading by the wire 189 to the conductor T', whereas the plate 184 is adapted to make contact with the contact member 188ˣ and complete the circuit through the conductor 190 to the conductor T, respectively. The cores 185 and 186 likewise carry plates 191 and 192, (insulated from the plates 183 and 184, respectively) adapted to complete circuits through the contacts 193 and 194 respectively, and the wires 195ˣ and 196ˢ respectively, to the conductors X and S. The plates 191 and 192, respectively, are adapted to make contact with the contact members 195 and 196 leading by the wires 197 and 198, respectively, to the solenoidal coils 187 and 188, respectively, for lifting the cores 185 and 186, a common return being had through the conductor 199. It will be observed that in the position shown in Fig. 2, the conductor T is fed through the circuit including the elements 180, 182, 184, 188ˣ, 190 T and Q, and the conductor T' is fed through the circuit including the elements 180, 181, 183, 187ˣ, 189 T' and Q. When, however, a trolley on the track E approaches the circuit changer Z, the collector 42 on contacting with the auxiliary conductor S will complete a circuit through the elements Q, T, S, 196ˢ, 194, 192, 196, 187 and 199 thereby energizing the coil 187 lifting the core 185 and interrupting the circuits including the plates 191 and 183 through which the conductors T' and X are fed. From the foregoing description it will be apparent that the conductors T and T' are continuously fed, save when the approach of a trolley having a collector bearing on one of the conductors S or X excites one of the solenoids 187 or 188 and interrupts that circuit which would allow an incoming trolley to interfere with the clear passage onto the part P of the main line A.

If for any reason delivery of brick to the guide tracks be temporarily suspended, they may be diverted to the storage track indicated at Aˣ having conductors Rˣ and Qˣ, and communicating with the track A by means of a manually operated switch Fˣ and a spring switch Nˣ.

While we have shown an improved conveyer system as arranged for use in a brick making establishment, it has obviously many other uses by extension and adaptation, and these are included within the scope of our invention and intended to be covered by our claims.

Having thus described our invention and illustrated its use, what we claim as new and desire to secure by Letters Patent is the following:

1. The combination with a track, of two electric feed conductors independent of the track and of each other, independent cars on the track provided with motors and grapples adapted to be moved into engagement with material electromagnetically, a driving circuit for each car, exciting circuits for each motor and grapple, the latter having operative contact with its conductor during the whole of that portion of the travel of the cars over which material is to be transported, said grapples being held in engaging position by the passage of current therethrough.

2. The combination with a track, of two electric feed conductors independent of the track and of each other, a car on the track provided with a motor and a grapple adapted to be moved into engagement with material electromagnetically, exciting circuits for said motor and grapple, respectively, having operative contact with said conductors during a portion only of the travel of the car, the exciting circuit for said motor circuit being closed before the exciting circuit for said grapple is closed.

3. The combination of a circuit of track, a series of cars thereon, electrically operated motors and grapples adapted to be moved into engagement with material electromagnetically on said cars, conductors for supplying current thereto, and independent motor and exciting circuits for said grapples, each having a contact member in contact with one of said conductors during one part of the travel of the cars and out of contact therewith during another part of such travel.

4. The combination with a car having an electric motor and an electrically operated engaging device, of a track and separate conductors for feeding the motor and the engaging device, and means for automatically operating both the motor and the engaging device during that portion of the travel of the car over which material is to be transported, the engaging device alone during another portion of such travel, and the motor alone during a third portion of such travel.

5. The combination of a motor driven car having a grapple having substantially flat vertical faces adapted to be moved into engagement with a load of material electromagnetically, of independent feed conductors to the motor and grapple, the conductor for said grapple having operative connection with said grapple during the whole of that portion of the travel of the car occupied by the transference of the load carried by the car.

6. The combination of a motor driven car having thereon an engaging device, and independent feed conductors to the motor and engaging device, said conductors being arranged to alternately energize the engaging device and motor during a portion of the travel of the car, to energize both the engaging device and the motor during another portion of such travel, and to cut both out of circuit during a third position of such travel.

7. The combination of a track, a car thereon, a grapple having substantially flat vertical faces adapted to be moved into engagement with a load of material by the passage of an electric current therethrough, means for operating the car, and means for cutting said grapple out of circuit during a portion of the travel of the car, and means for automatically bringing the grapple into disengaging position on the breaking of the circuit therethrough.

8. The combination of a track, two electric feed conductors independent of the track and each other, a car thereon provided with a motor, a grapple on said car, a solenoid adapted to positively move said grapple into engagement with material, a driving circuit for said motor, an exciting circuit for said solenoid respectively having contact with said conductors during a portion only of the travel of the cars.

9. The combination with a car and means for operating the same, of an engaging device on the car, an automatically electrically operable means for opening and closing the same, and automatically operable means for energizing the electrically operable means.

10. The combination with a car and means for operating the same, of an engaging device on the car, an automatically electrically operable means for opening and closing the same and automatically operable means for energizing the electrically operable means, said last named means being external of the car.

11. The combination with a car and a motor for operating the car, of a solenoidal grapple on the car adapted to engage material beneath the car, means for automatically actuating the same, and means operable independent of the motor connections for releasing it at predetermined points.

12. The combination with a car and a motor for driving the car, of a solenoidal grapple on the car adapted to engage material beneath the car, means for automatically actuating the same, and means operable independent of the motor connections for releasing it at predetermined points, said driving and actuating means being adapted for independent or simultaneous operations.

13. The combination with a track, a motor driven car and an engaging device on the car, of means for supplying current to said motor comprising a feed conductor and an independent motor circuit having operative contact with said conductor during a part of the travel of the car on said track, and automatic means external of the car for positively moving said device into engaging position during a part only of each travel.

14. The combination with a track, of two electric feed conductors independent of the track and of each other, independent cars on the track provided with motors and electrically operable engaging devices operable during a portion only of the travel of the cars, a driving circuit for each car and an exciting circuit for each engaging device, the latter having operative contact with its conductor during the whole period of transference of the load.

15. The combination with a track, of two electric feed conductors independent of the track and of each other, independent cars on the track provided with motors and grapples adapted to be moved into engagement with material electromagnetically, during a portion only of the travel of the cars, a driving circuit for each car and an exciting circuit for each grapple, the latter having operative contact with its conductor during the whole period of transference of the load.

16. The combination with a track, a motor driven car and an engaging device on the car including substantially flat vertical members adapted to be moved into engagement with a load of material by the passage of an electric current therethrough, of means for supplying current to said motor comprising a feed conductor and a motor circuit having operative contact with said conductor during a part of the travel of the car on said track, said device being held in engaging position by the passage of current therethrough.

17. The combination with a track of two electric feed conductors independent of the track and of each other, independent cars on the track provided with motors and grapples, adapted to be moved into engagement with material electromagnetically, a driving circuit for each car, an exciting circuit for each grapple, and means independent of the motor connections for automatically electrically energizing the grapples during a part of the time the driving circuit is operative.

In witness whereof we have hereunder signed our names in the presence of the two subscribed witnesses.

BERNARD F. WEBER.
FRANK E. WOODFORD.

Witnesses:
GEO. C. DAVISON,
PAUL CARPENTER.